United States Patent [19]

Traner et al.

[11] Patent Number: 4,997,213

[45] Date of Patent: Mar. 5, 1991

[54] ENCAPSULATED BRANCH COOLANT HOSE

[75] Inventors: Dale Traner, Littleton; Layne Railsback, Brighton; James McDaniel, Conifer; Bradley Chaffee, Littleton, all of Colo.

[73] Assignee: The Gates Rubber Company, Denver, Colo.

[21] Appl. No.: 462,310

[22] Filed: Dec. 21, 1989

Related U.S. Application Data

[63] Continuation of Ser. No. 19,088, Feb. 25, 1987.

[51] Int. Cl.⁵ ............................................. F16L 41/00
[52] U.S. Cl. .................................... 285/155; 285/292; 285/371; 285/915; 285/423; 156/296
[58] Field of Search ............... 285/292, 155, 915, 371, 285/331, 398, 423; 156/296

[56] References Cited

U.S. PATENT DOCUMENTS

| | | | |
|---|---|---|---|
| 2,896,976 | 7/1959 | Wiltse | 285/292 |
| 3,784,235 | 1/1974 | Kessler | 285/915 X |
| 4,257,630 | 3/1981 | Bartell et al. | 285/371 X |
| 4,289,337 | 9/1981 | Roe | 285/915 |
| 4,514,244 | 4/1985 | Shaefer et al. | 285/398 X |
| 4,637,638 | 1/1987 | Rush et al. | |
| 4,648,628 | 3/1987 | Meadows et al. | 285/423 X |
| 4,660,867 | 4/1987 | Kemper et al. | 285/915 X |
| 4,676,532 | 6/1987 | Gronaw et al. | 285/915 X |
| 4,718,700 | 1/1988 | Horch et al. | 285/423 X |

FOREIGN PATENT DOCUMENTS

| | | |
|---|---|---|
| 110102 | 6/1984 | European Pat. Off. . |
| 8329337 | 8/1985 | Fed. Rep. of Germany . |
| 2595437 | 4/1986 | France . |
| 852681 | 10/1960 | United Kingdom ............... 285/331 |
| 2033519 | 5/1980 | United Kingdom . |
| 2157386 | 10/1985 | United Kingdom . |

*Primary Examiner*—Dave W. Arola
*Attorney, Agent, or Firm*—H. W. Oberg, Jr.; C. H. Castleman, Jr.

[57] ABSTRACT

A method of assembling a connection for branched radiator coolant hose in which the hoses to be connected are adhered onto the ends of a T-shaped connector. Then a capsule of rubber is molded around the area of the connection and cured to form a unitary and integral connection.

14 Claims, 1 Drawing Sheet

ENCAPSULATED BRANCH COOLANT HOSE

This is a continuation of Ser. No. 019,088 filed Feb. 25, 1987.

FIELD OF THE INVENTION

The invention pertains to the joining of branched coolant hoses in general, and in particular to the joining of internal combustion engine coolant system branched hoses.

BACKGROUND OF THE INVENTION

Coolant systems on internal combustion engines in general, and on automotive engines in particular, are increasingly relying on the use of branched hoses. A branched rubber hose is a difficult article to manufacture with efficiency in great numbers, and many previous attempts at manufacturing such hoses have resulted in products that were not entirely reliable against leakage once the system was pressurized. The junction of a branched radiator hose is the weakest point in the system as far as leakage is concerned, and although many ingenious methods have been devised of branching hoses, this still remains a problem. A branched hose junction should preferably have extra features of construction incorporated into its design to meet the known deficiencies associated with branched hoses, and yet have an esthestically acceptable exterior appearance.

SUMMARY OF THE INVENTION

The encapsulated branched coolant hose connector seals and secures the terminal end of several polymeric hoses by being based on the use of a hollow connector, branched so as to accommodate the number and orientation of hoses to be connected, with each end of the connector having a nipple. Adhesive is applied to the outer surface of the connector, and then the component hoses are made to slide onto and fit over each respective nipple. Then, a capsule of polymer is molded onto the portion of the connector which is uncovered and the end portions of those hoses fitted onto nipples, with the capsule then being cured to form a cohesive, agglomerated continuous mass between itself and the end portions of the hoses.

DETAILED DESCRIPTIONS OF THE DRAWINGS

The following discussion is intended to be a disclosure of both an encapsulated branched coolant hose as a product, and of a method of its manufacture.

Figure 1:
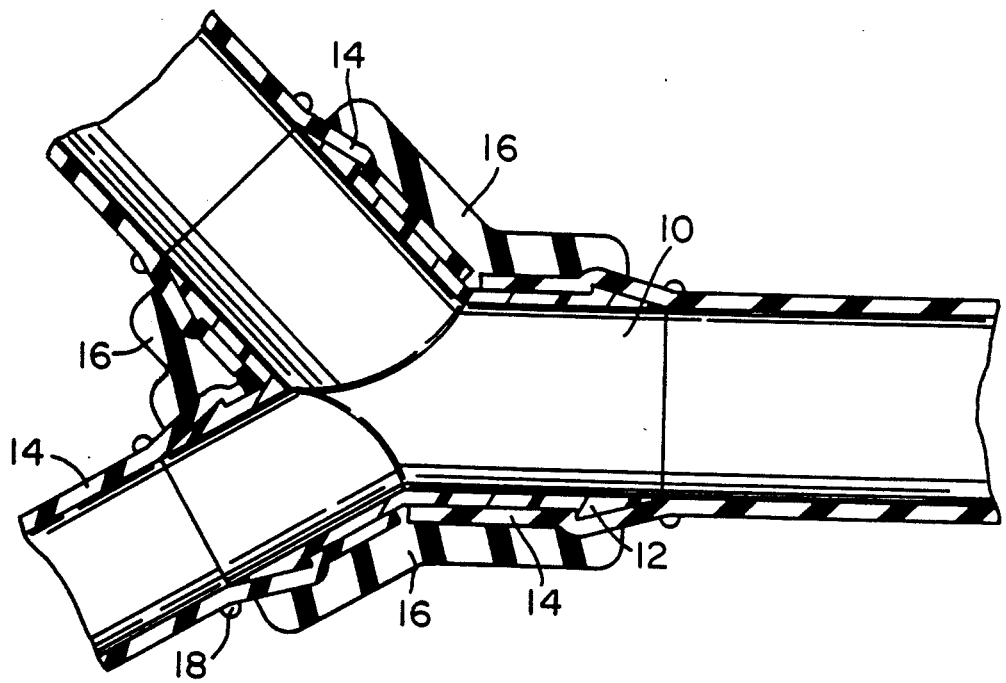
FIG. 1 is a cross-sectional view of the most preferred embodiment of the encapsulated branched coolant hose, showing the hollow connector with three hoses mounted on it and an encapsulation of rubber covering the connector and the end portions of the hoses.

Construction of the invention begins with fabricating a hollow, integral connector piece. Generally, the connector piece will be some type of a hollow T-shaped connector with the orientation and dimensions of the connector calculated so as to meet the needs of the hoses in the coolant system. Therefore, it can be seen that any number of diverse sizes of hoses can be connected in this particular connecting system. Most preferably, the connector will be made of a cast or molded polymer, such as a phenolic resin, although where a given configuration would be machinable, the connector could just as well be metallic or ceramic. We have found that the connector works especially well when the nipples have radially enlarged portions in the shape of frusto-conical obverse tapers, as shown in FIG. 1 at 12. When a hose 14 is ready to be mounted on a connector 10, it is made to slide onto and fit over the taper 12.

It is also preferable to adhesively coat the exterior of the connector before attaching hoses to it. This means that the connector of the invention is not a floating connector, but rather a fixed connector. This is important since conventional though in the art of using connectors in branched coolant hose applications has it that a floating connector which has not had any adhesive applied to its exterior is less prone to failure. We have found that application of an adhesive in our particular invention decreases the failure rate. Any adhesive can be used that is sufficient to bond the polymer chosen for the connector to the polymer or elastomer chosen for the hoses and capsule.

After the respective component hoses have been forceably fitted onto the connector piece, the junction is then fixed into a conventional molding apparatus, as, for example, a clamshell type of mold. Then an encapsulation of polymer, most preferably rubber, is molded around the junction, as shown at 16. When the entire piece is cured, the capsule 16 and the hoses 14 form a continuous mass around each circumference and periphery of the connector which is not covered by a hose. Molding of the capsule may be by any means known to those skilled in the art, although we especially favor the use of transfer molding. In some applications, it may be desirable also to circumferentially mount an annular bead 18 onto the exterior of the hose surface in the neighborhood of the end portion of the connector piece 10. Annular bead 18 is mounted over that portion of each hose 14 which is fitted over nipple or taper 12.

Figure 2:
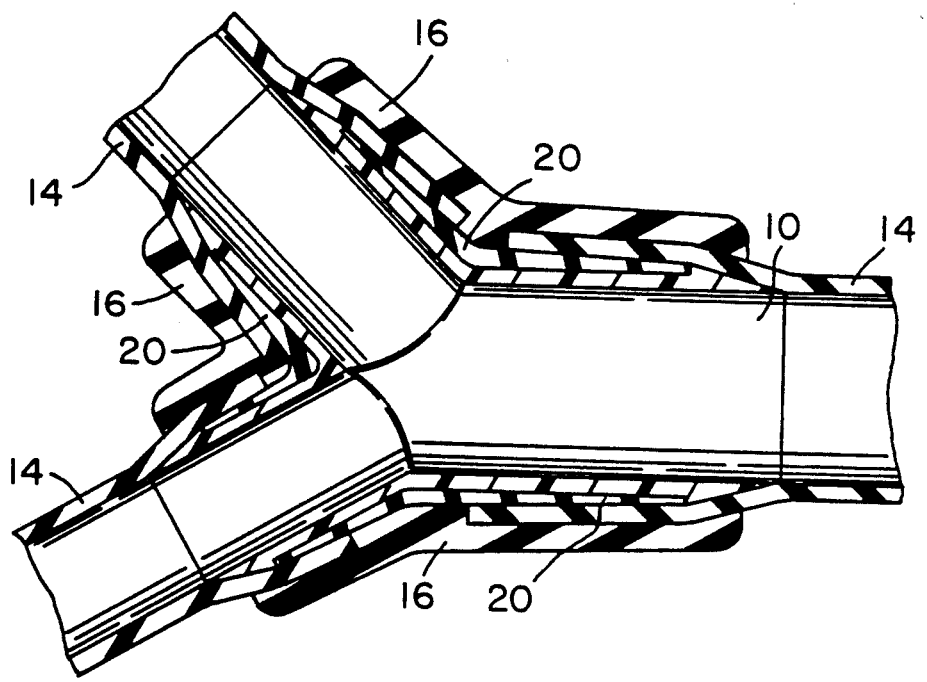
FIG. 2 shows an alternative embodiment of the invention in which a layer of rubber has been adhered to the connector piece prior to the installation of hoses onto the ends of the connector, thus resulting in two, and in some places three, layers of rubber over the polymeric connector shown therein.

In one important alternative embodiment of the invention shown in FIG. 2, the integral hose connector 10 has had an inner rubber capsule 20 molded onto it prior to mounting of the hoses 14. When the outer capsule 16 is then molded onto the connection, this results in a continuous adhesive agglutinated mass between the inner capsule, the hose ends and the outer capsule. This is especially useful as an extra method of sealing off hose ends which expose textile reinforcement fiber and yarn ends that otherwise are especially susceptible to wicking of the fluid contents in the hoses. Again, the inner capsule 20 can be molded onto the connector piece 10 by any means well known to those skilled in the art.

It is thought that the encapsulated branched coolant hose and method of the present invention and many of its intended advantages will be understood from the foregoing description, and it will be apparent to those skilled in the art that various changes may be made in the form, construction and arrangement of the parts thereof without departing from the spirit and scope of the invention or sacrificing all of its material advantages. The forms herein described are merely preferred embodiments, and the description herein should not be construed or interpreted as the only embodiment. Although this description has largely discussed application of this invention to cooling systems of internal combustion engines, this is only one major application of the technology and other applications to the production of other products, such as hose systems for appliances, are not intended to be precluded. The following claims should therefore be interpreted as broadly as is reasonable.

What is claimed is:

1. A hose assembly comprising:
   at least one polymeric hose having terminal end portions;
   an integral, hollow connector branched in a predetermined configuration and having radially enlarged portions defining a predetermined number of nipples so as to accommodate the number and orientation of each of said at least one polymeric hose to be connected;
   a layer of adhesive disposed between each nipple of the connector and a terminal end portion of the at least one polymeric hose, a terminal end portion of every said hose radially distended over the radially enlarged portions and fit over its respective nipple, and in contact with said adhesive; and
   a capsule of polymer molded onto and covering substantially all of a portion of the connector and one of said terminal end portions of each of said at least one polymeric hose including and extending axially past the maximum radially distended portion, the capsule cured and forming a cohesive, agglomerated continuous mass with said one terminal end portion of each of said at least one polymeric hose and the connector.

2. The assembly as claimed in claim 1 in which the hollow connector is a T-shaped connector.

3. The assembly as claimed in claim 1 in which the hollow connector is made of a polymeric material.

4. The assembly as claimed in claim 1 in which said at least one polymeric hose is made of rubber.

5. The assembly as claimed in claim 1 in which the capsule is made of rubber.

6. The assembly as claimed in claim 1 in which the capsule has been molded onto the subassembly by transfer molding.

7. The assembly as claimed in claim 1 in which said at least one polymeric hose has a textile fiber reinforcement, said at least one polymeric hose having an exposed end which is sealed off by the polymeric capsule.

8. The assembly as claimed in claim 1 wherein said capsule of polymer is molded onto and covers substantially all of said one of said terminal end portions of each of said at least one polymeric hose including a portion of each of said one of said terminal end portions which is fit over its respective nipple and is juxtaposed a radially enlarged portion.

9. A hose assembly comprising:
   at least one elastomeric hose;
   an integral polymeric connector, branched in a predetermined configuration so as to accommodate the number and orientation of each of said at least one hose, every end portion of the connector that is to seal and secure one of said at least one hose having a nipple, the nipple having a radially enlarged portion that has a substantially frustoconical obverse taper, each of said every end portion having an end of one of said at least one hose radially distended and fit over the obverse taper;
   a layer of adhesive disposed between the nipple of each end portion and the inner surface of the end of each of said at least one hose; and
   an outer capsule of elastomer molded onto and covering substantially all of a portion of said connector which is uncovered and cured to form a cohesive, agglomerated continuous mass with the one end of every hose to seal the assembly against fluid leakage and wherein said outer capsule of elastomer is molded onto and covers substantially all of each said one hose including that portion which is fit over the obverse taper.

10. A hose assembly comprising:
    at least one elastomeric hose;
    an integral polymeric connector, branched in a predetermined configuration so as to accommodate the number and orientation of each of said at least one hose, every end portion of the connector that is to seal and secure one of said at least one hose having a nipple, the nipple having a radially enlarged portion that has a substantially frustoconical obverse taper, each of said every end portion having an end of one of said at least one hose fit over the obverse taper;
    a layer of adhesive disposed between the nipple of each end portion and the inner surface of the end of each of said at least one hose; and
    an outer capsule of elastomer molded onto and covering substantially all of a portion of said connector which is uncovered and cured to form a cohesive, agglomerated continuous mass with the one end of every hose to seal the assembly against fluid leakage; and
    an inner capsule of elastomer molded onto and covering a substantial portion of the connector, being situated in between the connector and each of said end of said at least one hose, with that portion of the inner capsule that is not covered exteriorly by each of said end of said at least one hose being covered exteriorly by at least a portion of the outer capsule.

11. A hose assembly comprising:
    a plurality of elastomeric hoses;
    an integral, hollow connector having a plurality of branches which corresponds in number to the said plurality of hoses, each of said branches having an end portion defining a radially enlarged nipple, each of said hoses having one end radially distended and fit over said radially enlarged nipple of one of said branches;
    an adhesive positioned between said one end of each of said hoses and said nipple of each of said branches to bond said connector to said plurality of hoses; and
    a capsule of polymer molded onto substantially all of a portion of said connector which is uncovered and said one end of each of said plurality of hoses and cured to form a cohesive, agglomerated mass which is integral with said one end of each of said plurality of hoses and said portion of said connector and wherein said capsule of polymer is molded onto and covers substantially all of said one end of each of said plurality of hoses including a portion of one end of each of said plurality of hoses which is fit over said radially enlarged nipples and extending axially beyond the maximum enlargement thereof.

12. A hose assembly comprising:

a plurality of elastomeric hoses;

an integral, hollow connector having a plurality of branches which coresponds in number to the said plurality of hoses, each of said branches having an end portion defining a radially enlarged nipple, each of said hoses having one end fit over said nipple of one of said branches;

an adhesive positioned between said one end of each of said hoses and said nipple of each of said branches to bond said connector to said plurality of hoses;

a capsule of polymer molded onto substantially all of a portion of said connector which is uncovered and said one end of each of said plurality of hoses and cured to form a cohesive, agglomerated mass which is integral with said one end of each of said plurality of hoses and said portion of said connector; and a second capsule of polymer molded onto said connector prior to said one end of each of said hoses being fit over said nipple of one of said branches and cured to form a cohesive, agglomerated mass which is integral with said connector, said capsule of polymer being molded onto substantially all of a portion of said second capsule covering said portion of said connector and onto substantially all of said one end of each of said plurality of hoses and cured to form a cohesive, agglomerated mass which is integral with said one end of each of said plurality of hoses and said portion of said second capsule.

13. A method of manufacturing a hose assembly comprising:

installing one end of each of a plurality of elastomeric hoses onto a separate branch of a branched, hollow connector having a radially enlarged portion on each branch by forcibly sliding said one end onto said separate branch and distending each end over a radially enlarged portion;

positioning a layer of adhesive between each of said one end of a plurality of hoses and said separate branch, said layer of adhesive bonding said one end of each of said plurality of elastomeric hoses to said separate branch to which said one end is connected:

molding a capsule of elastomer around a sufficient portion of every said one end including the radially enlarged portion and a portion of the connector uncovered by said one ends; and curing the elastomer in the capsule to form a unitary, agglomerated continuous mass so as to seal the assembly against fluid leakage.

14. A method of manufacturing a hose assembly comprising;

installing one end of each of a plurality of elastomeric hoses onto a separate branch of a branched, hollow connector by forcibly sliding said one end onto said separate branch;

positioning a layer of adhesive between each of said one end of a plurality of hoses and said separate branch, said layer of adhesive bonding said one end of each of said plurality of elastomeric hoses to said separate branch to which said one end is connected;

molding a capsule of elastomer around a sufficient portion of every said one end and a portion of the connector uncovered by said one ends;

curing the elastomer in the capsule to form a unitary, agglomerated continuous mass so as to seal the assembly against fluid leakage; and molding a second capsule of elastomer onto said connector prior to said step of installing, said elastomer in said second capsule being cured with said elastomer in the capsule.

* * * * *